Patented May 11, 1948

2,441,550

UNITED STATES PATENT OFFICE 2,441,550

PROCESS OF PRODUCING CHLORINE AND SODIUM SULFATE

Arthur W. Hixson, Leonia, N. J., and Ralph Miller, New York, N. Y., assignors to The Chemical Foundation, Incorporated, a corporation of Delaware No Drawing. Application March 21, 1939, Serial No. 263,190

10 Claims. (Cl. 23—219)

1

This invention is concerned with the production of chlorine and sodium sulfate.

At the present time the production of chlorine and sodium sulfate is accompanied by the production of caustic soda and hydrochloric acid. As the demand for chlorine and sodium sulfate is increasing at a rate greater than the demand for caustic soda and hydrochloric acid, it is desirable to have at industry's disposal a process whose sole products are chlorine and sodium sulfate.

It is an object of this invention to produce chlorine and salt cake from sulfur and salt.

It is a further object of this invention to produce chlorine and salt cake without employing water in the process.

It is a further object of this invention to produce chlorine and salt cake in such manner that no inert gas shall be present during the process of formation of the desired products.

It is a further object of this invention to produce chlorine and sodium sulfate in such manner that no free oxygen shall be present during the process of formation of the desired products.

It is a further object of this invention that in the entire process, as described hereafter, any gases that may be present shall be readily condensable.

No practical process has been devised up to this time by which chlorine and salt cake can be produced from salt and sulfur. It is obvious that if chlorine is to be produced from salt by chemical means, it is necessary to employ an oxidizing agent. The cheapest oxidant available is the oxygen contained in the air. The previous art in this field recognized this fact and employed air or oxygen as the oxidizing agent. If air is employed as the oxidant, then any chlorine produced is diluted with a large volume of nitrogen. Because of this fact, the chlorine cannot be readily liquefied and transported, and any process employing air as the oxidant consequently becomes impractical except for some minor uses such as the production of bleaching powder. If pure oxygen is employed as the oxidant, then the cost of securing this pure oxygen irrespective of the means employed, makes the cost of the entire process too high to be practical. In addition, the oxygen cannot be utilized completely so that the cost of separating the chlorine from the oxygen must be borne. For these reasons, none of the previous processes in this field have ever been utilized commercially.

We have discovered that a process for the formation of chlorine and sodium sulfate from salt and sulfur is practical if the production of these materials is carried out by employing an oxidant which is not diluted with any other substance, which can be utilized as completely as desired, which permits but a small energy loss if the oxidant is not utilized completely, and whose reduction product can be easily separated from the sodium sulfate and chlorine; and if all the substances that partake in the process are readily separated.

There are many different ways by which this process can be carried out. For example: Liquid sulfur trioxide is added to solid sodium chloride to form the solid $NaSO_3Cl$. Upon heating, the sodium chlorosulfonate decomposes into sodium sulfate and sulfur dioxide and chlorine. The sulfur dioxide can be readily separated from the chlorine by liquefaction or extraction and subsequent rectification. The sulfur dioxide may then be converted into sulfur trioxide in a manner similar to that employed in a contact sulfuric acid plant. In this way, the sodium chloride is completely converted to sodium sulfate and the chloride part of the salt converted into chlorine.

Another manner in which this process may be carried out is to burn sulfur or pyrites to form sulfur dioxide. The sulfur dioxide is then converted to sulfur trioxide in a manner familiar to the art. The sulfur trioxide is cooled below 100° C. and the gas stream in which it is contained is passed over sodium chloride. The sodium chloride absorbs the $SO_3$ present in the form of a gas to form sodium chlorosulfonate. The sodium chlorosulfonate is then thermally decomposed to form sodium sulfate, chlorine and sulfur dioxide. The sulfur dioxide is then reprocessed to form additional sulfur trioxide.

Another method which is operative is to add chlorosulfonic acid to sodium chloride to form gaseous hydrogen chloride and sodium chlorosulfonate. The solid sodium chlorosulfonate is then thermally decomposed to form sodium sulfate, chlorine and sulfur dioxide. The sulfur dioxide may then be converted to sulfur trioxide after separation from the chlorine. The gaseous hydrogen chloride previously formed may then be combined with this sulfur trioxide and additional sulfur trioxide from another source to form chlorosulfonic acid, which can then be employed to treat some more sodium chloride.

It is also possible and sometimes advantageous to treat sodium chloride with sulfur trioxide at sufficiently elevated temperatures to form sodium sulfate, chlorine and sulfur dioxide. The chlorine and sulfur dioxide and any unreacted sulfur trioxide are liquefied, the chlorine is separated by rectification, and the oxides of sulfur converted once more to sulfur trioxide for reuse.

It is to be noted that in each of the examples above mentioned, the products of the reaction have been formed in such manner that there is little or no difficulty in separating the various products of the reaction. This is an important characteristic of our novel process. No other process contains this unique advantage, nor has the previous art been aware of the utility of such a procedure. Further advantages and useful characteristics of our invention will be pointed out below.

In the preceding examples of how this process may be carried out, it is to be noted that water is not employed. Due to the absence of water, corrosion difficulties are minimized, with a consequent saving in the cost of the materials of construction of the necessary equipment.

The chemical equations that describe the process which constitute this invention are:

(1) $\quad S + O_2 = SO_2$
(2) $\quad 2SO_2 + O_2 = 2SO_3$
(3) $\quad 2SO_3 + 2NaCl = Na_2SO_4 + SO_2 + Cl_2$ Equations 1 and 2 are well-known chemical processes. Equation 3 precisely describes the method of production of the desired products. The reaction represented by Equation 3 may be carried out in a variety of ways, as has been indicated. The formation of the intermediate sodium chlorosulfonate is optional but is the preferred method. When the intermediate compound is formed the sequence of reactions is:

(1) $\quad S + O_2 = SO_2$
(2) $\quad 2SO_2 + O_2 = 2SO_3$

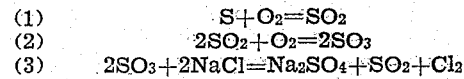

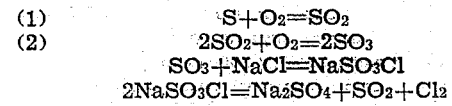

The thermal decomposition of the intermediate compound may be carried out at any convenient temperature within the range 200°–1000° C. If the thermal decomposition is carried out below 360° C., some sulfuroxychlorides will form. These compounds can be decomposed by heating above 360° C. subsequent to the formation of the sodium sulfate, or they may be decomposed by leading them over catalytic material such as activated carbon. Irrespective of the temperature of decomposition, the gaseous compounds present are readily condensed by cooling or cooling and compression.

The thermal decomposition of the intermediate compound may be carried out under pressure so that simple cooling of the evolved gases will cause their condensation. The liquid mixture can then be separated into its components by simple rectification. In this manner, it is possible to produce liquid chlorine directly.

Reference has been made to the fact that water does not enter into this process at any time. Some of the advantages which accrue because of this fact have been noted already. Another important advantage is that the chlorine produced must not be dried prior to its liquefaction. The drying of chlorine gas when it is produced electrolytically or from nitric acid is one of the expensive steps in each process. This expense is entirely obviated when the procedure described herein is followed.

The sulfur trioxide employed in this process may be derived from any source. Its production is no part of this invention. Equivalent quantities of liquid sulfur trioxide and solid sodium chloride may be mixed together with any necessary cooling to form sodium chlorosulfonate. The production of this compound takes place readily, completely, and without any complications. Any form of equipment which permits the complete mixing of the two reactants may be employed. If desired, the temperature can be adjusted to about 150° C. for NaSO$_3$Cl melts approximately in that neighborhood. In this way a liquid is the product of the reaction. The intermediate salt compound may be formed in batches or continuously.

The liquid or solid, depending upon which is more convenient to handle, is then thermally decomposed under pressure, or not, as is best under the particular circumstances. The thermal decomposition takes place readily upon the application of heat. Any equipment that affords ready transference of heat to the salt can be used. The thermal decomposition takes place continuously or in batches. If desired, the temperature may be raised above the melting point of salt cake so that molten sodium sulfate can flow continuously from the decomposition furnace.

The evolved gases are separated into chlorine and sulfur dioxide. The chlorine is liquefied while the sulfur dioxide is converted to sulfur trioxide and reused.

An example of how this process may be operated is to burn pyrites or sulfur with air that has been dehydrated. The sulfur dioxide that is formed plus excess air is passed over a catalytic contact mass to form sulfur trioxide. No acid mist is formed because of the absence of water. The sulfur trioxide is absorbed in weak oleum to form a concentrated or strong oleum solution. The strong oleum is continuously withdrawn and heated to expel or distill off sulfur trioxide. The dilute oleum is cooled and returned to the absorption system. The sulfur trioxide is condensed by cooling to form liquid sulfur trioxide.

Solid sodium chloride which has been treated to remove any adsorbed water is continually added to the liquid sulfur trioxide, so that a mol of salt is added to each mol of sulfur trioxide. The liquid and solid are thoroughly mixed to form solid sodium chlorosulfonate. The sodium chlorosulfonate is then thermally decomposed under pressure at 350° C.–400° C. The evolved gases, sulfur dioxide and chlorine, are cooled to the appropriate temperature to cause the condensation of sulfur dioxide. The liquefaction apparatus is connected to the thermal decomposition furnace so that the pressure on the system will be automatically determined by the temperature of the cooling water available. The liquid sulfur dioxide is rectified so that pure liquid sulfur dioxide free from chlorine is withdrawn from the bottom of the distillation equipment.

The chlorine passes to a second liquefaction and rectification apparatus. The liquid sulfur dioxide previously withdrawn is vaporized with the absorption of heat. The refrigeration achieved by this step is employed to cool the chlorine in the chlorine liquefaction apparatus. In this manner pure liquid chlorine is withdrawn from the chlorine condenser. The sulfur dioxide is fed back into the sulfur dioxide-air stream which is to be passed over the catalytic mass to form sulfur trioxide once more.

The other decomposition product is sodium sulfate, which is continually removed from the furnace. The purity of the sodium sulfate depends upon the purity of the initial sodium chloride and any impurities that might be derived from the furnace.

Very important heat economies may be practiced with this process. In the production of sulfur trioxide, it is necessary that the sulfur dioxide that reaches the contact mass be free from dust and other injurious impurities. Sulfur dioxide that is cool is more readily purified than hot $SO_2$. The heat obtained by burning sulfur to sulfur dioxide may be employed to cause the thermal decomposition of sodium chlorosulfonate. In this way the sulfur dioxide is cooled and the thermal decomposition is accomplished. The latent heat of vaporization of sulfur dioxide may be employed to aid the condensation of chlorine, as has been indicated. If it is desired, the refrigeration achieved by the expansion of sulfur dioxide can be used to cool the weak oleum employed to absorb sulfur trioxide. Heat is needed to expel sulfur trioxide from oleum. This heat may be obtained from the combustion of sulfur or from the heat obtained by the oxidation of sulfur dioxide to sulfur trioxide. All processes that have been suggested up to the present for the production of liquid chlorine, require an expenditure of heat from an auxiliary fuel or a supply of power in order to compress the chlorine in order to liquefy it. The process disclosed by the above example indicates that the requirement is automatically supplied by the intrinsic nature of the process.

The preceding specification discloses to men skilled in the art, novel methods by which all the objects of this invention may be readily accomplished.

As will be obvious, where the appended claims recite the step of burning sulfur-containing material to form sulfur dioxide, it is to be understood that sulfur as such may be used; and that where the claims specify chlorine, free chlorine ($Cl_2$) is meant.

Having thus described our invention, we claim:

1. The process of producing chlorine and sodium sulfate comprising the steps of converting sulfur dioxide to sulfur trioxide; cooling the sulfur trioxide so that it may be absorbable in oleum containing less than 20% free sulfur trioxide; contacting the said trioxide and oleum whereby oleum containing more than 40% free sulfur trioxide is obtained; heating the oleum to form free sulfur trioxide and oleum containing less than 20% free sulfur trioxide; contacting the sulfur trioxide with sodium chloride so that a substantial amount of sodium chlorosulfonate is formed; thermally decomposing the sodium chlorosulfonate at temperatures higher than 360° C. to form gaseous chlorine, and sulfur dioxide, and solid sodium sulfate; separating the solid product from the gaseous products, and separating the sulfur dioxide from the chlorine.

2. The process of producing chlorine and sodium sulfate comprising the steps of converting sulphur dioxide to sulfur trioxide; cooling the sulfur trioxide so that it may be absorbable in oleum containing less than 20% free sulfur trioxide; contacting the said trioxide and oleum whereby oleum containing more than 40% free sulfur trioxide is obtained; heating the oleum to form free sulfur trioxide and oleum containing less than 20% free sulfur trioxide; contacting the sulfur trioxide with sodium chloride in an anhydrous atmosphere so that a substantial amount of sodium chlorosulfonate is formed; thermally decomposing the sodium chlorosulfonate at temperatures higher than 360° C. to form gaseous chlorine, and sulfur dioxide, and solid sodium sulfate; separating the solid product from the gaseous products, and separating the sulfur dioxide from the chlorine.

3. The process of producing chlorine and sodium sulfate comprising the steps of converting sulphur dioxide to sulfur trioxide; cooling the sulfur trioxide so that it may be absorbable in oleum containing less than 20% free sulfur trioxide; contacting the said trioxide and oleum whereby oleum containing more than 40% free sulfur trioxide is obtained; heating the oleum to form free sulfur trioxide and oleum containing less than 20% free sulfur trioxide; contacting the sulfur trioxide at a temperature below 150° C. with dry sodium chloride so that a substantial amount of sodium chlorosulfonate is formed; thermally decomposing the sodium chlorosulfonate at temperatures higher than 360° C. in an environment composed of gases, all of which are readily condensable to form gaseous chlorine, and sulfur dioxide, and solid sodium sulfate; separating the solid product from the gaseous products, and separating the sulfur dioxide from the chlorine.

4. The process of producing chlorine and sodium sulfate comprising the steps of converting sulphur dioxide to sulfur trioxide; cooling the sulfur trioxide so that it may be absorbable in oleum containing less than 20% free sulfur trioxide; contacting the said trioxide and oleum whereby oleum containing more than 40% free sulfur trioxide is obtained; heating the oleum to form free sulfur trioxide and oleum containing less than 20% free sulfur trioxide; contacting the sulfur trioxide in the liquid phase with sodium chloride so that a substantial amount of sodium chlorosulfonate is formed; thermally decomposing the sodium chlorosulfonate at temperatures higher than 360° C. to form gaseous chlorine, and sulfur dioxide, and solid sodium sulfate; separating the solid product from the gaseous products, and separating the sulfur dioxide from the chlorine.

5. The process of producing chlorine and sodium sulfate comprising the steps of converting sulphur dioxide to sulfur trioxide; cooling the sulfur trioxide so that it may be absorbable in oleum containing less than 20% free sulfur trioxide; contacting the said trioxide and oleum whereby oleum containing more than 40% free sulfur trioxide is obtained; heating the oleum to form free sulfur trioxide and oleum containing less than 20% free sulfur trioxide; contacting the sulfur trioxide with sodium chloride so that a substantial amount of sodium chlorosulfonate is formed; thermally decomposing the sodium chlorosulfonate under pressure at temperatures higher than 360° C. to form gaseous chlorine, and sulfur dioxide, and solid sodium sulfate; separating the solid product from the gaseous products; cooling the gaseous products whereby they are condensed; rectifying the liquid mixture to form liquid sulfur dioxide free from chlorine; separating the liquid from the gaseous chlorine; vaporizing the liquid sulfur dioxide and employing the refrigerating effect thereof to cool and condense the chlorine.

6. In the process set forth in claim 1, the steps including the cooling of the oleum containing less than 20% free sulfur trioxide and returning same to the sulfur trioxide absorption stage of the cyclic process.

7. In the process set forth in claim 1, the steps including the return of the sulfur dioxide as separated from the chlorine at the end stage of the process described, and returning same to the conversion stage thereof for the cyclic production of sulfur trioxide therefrom.

8. A cyclic process of producing chlorine and sodium sulfate which comprises effecting, under anhydrous conditions, a reaction between sulfur trioxide and sodium chloride in the absence of free oxygen and at a temperature sufficiently elevated so that a substantial amount of sodium chlorosulfonate is formed; then thermally decomposing the sodium chlorosulfonate to evolve gaseous chlorine and sulfur dioxide; recovering sodium sulfate; cooling the gaseous products to separate chlorine from sulfur dioxide, mixing said sulfur dioxide with burner gases containing air and sulfur dioxide, catalytically oxidizing the sulfur dioxide into the resulting gas mixture to sulfur trioxide, absorbing the sulfur trioxide in sulfuric acid to produce oleum, heating the resulting oleum to recover undiluted sulfur trioxide and reacting the same with more sodium chloride in the first reaction stage for continued production of sodium sulfate and chlorine.

9. The process of producing sodium sulfate and chlorine consisting in treating sodium chloride with sulfur trioxide in mol to mol proportions so that a substantial amount of sodium chlorosulfonate is formed, then thermally decomposing said sodium chlorosulfonate above about 360° C. to form sodium sulfate, chloride and sulfur dioxide, separating the gases from the solid, separating the chlorine from the sulfur dioxide, converting the separated sulfur dioxide to sulfur trioxide, and employing said sulfur trioxide to produce additional sodium chlorosulfonate.

10. The process of producing chlorine and sodium sulfate consisting in converting sulfur dioxide to sulfur trioxide, cooling said sulfur trioxide below about 100° C., reacting the sulfur trioxide with sodium chloride in mol to mol proportions at a temperature below 100° C. so that a substantial amount of sodium chlorosulfonate is formed then thermally decomposing the addition compound above about 360° C. to form sodium sulfate, chlorine and sulfur dioxide and separating the products of the decomposition step.

ARTHUR W. HIXSON.
RALPH MILLER.

REFERENCES CITED

The following references are of record in the file of this patent:

UNITED STATES PATENTS

| Number | Name | Date |
|---|---|---|
| 800,218 | Knietsch | Sept. 26, 1905 |
| 1,605,004 | Shapleigh | Nov. 2, 1926 |
| 2,276,079 | Maude | Mar. 10, 1942 |

FOREIGN PATENTS

| Number | Country | Date |
|---|---|---|
| 132,923 | Great Britain | Oct. 2, 1919 |
| 249,474 | Great Britain | Oct. 28, 1926 |
| 384,615 | Great Britain | Dec. 8, 1932 |

OTHER REFERENCES

Mellor, Comprehensive Treatise on Inorganic and Theoretical Chemistry, vol. X, pages 687, 689 and 344.

Traube, Article in Berichte, vol. 46 (1913), pages 2513–2521.